May 6, 1941.  C. F. GREINER  2,240,887
DRIVE WHEEL LOCK
Filed Nov. 12, 1940  3 Sheets-Sheet 1
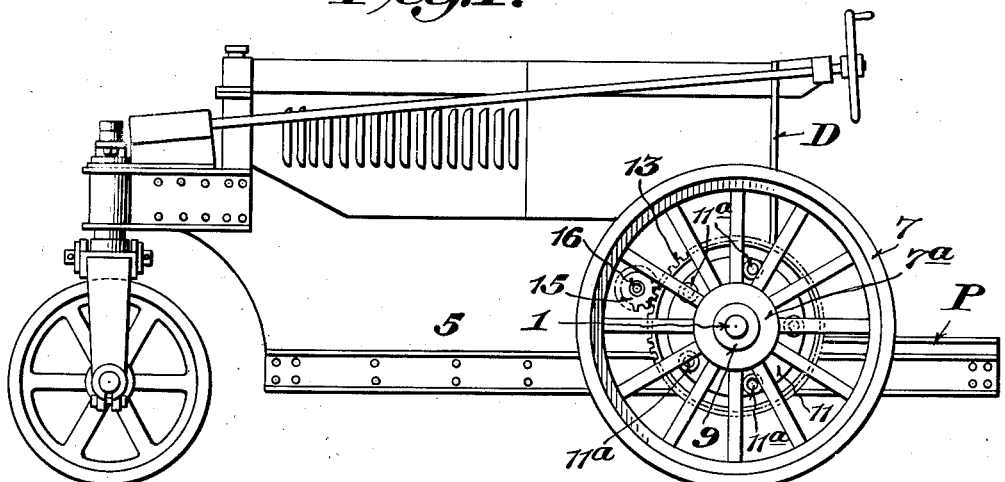
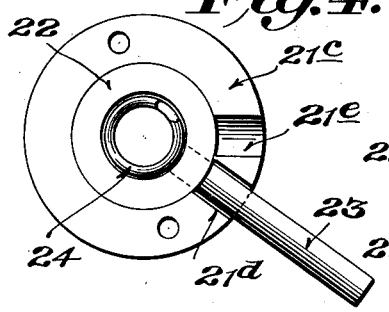
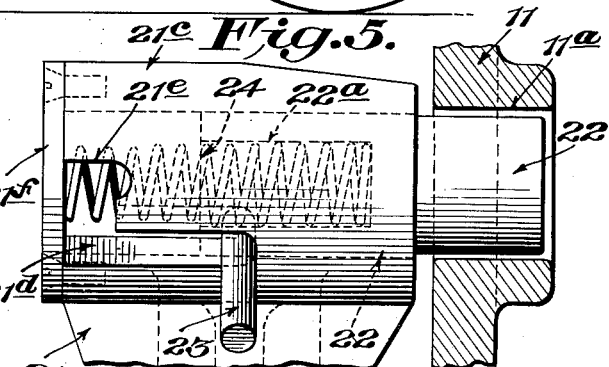
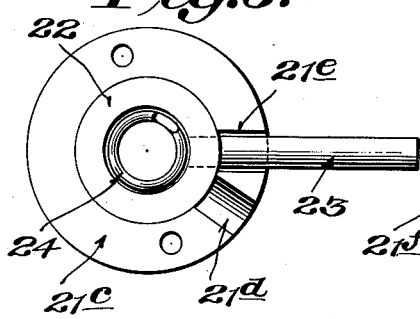
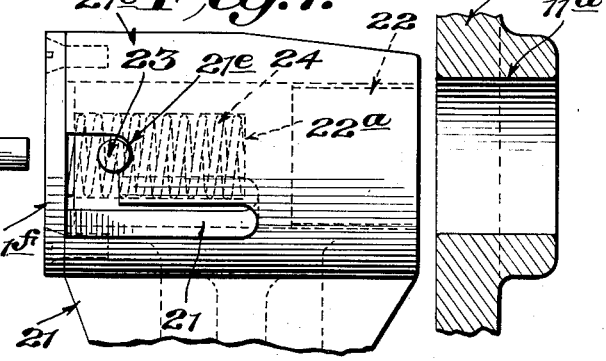
Inventor
Carl F. Greiner
By Alexander Dowell
Attorneys May 6, 1941.                C. F. GREINER                2,240,887
                           DRIVE WHEEL LOCK
                        Filed Nov. 12, 1940            3 Sheets-Sheet 3
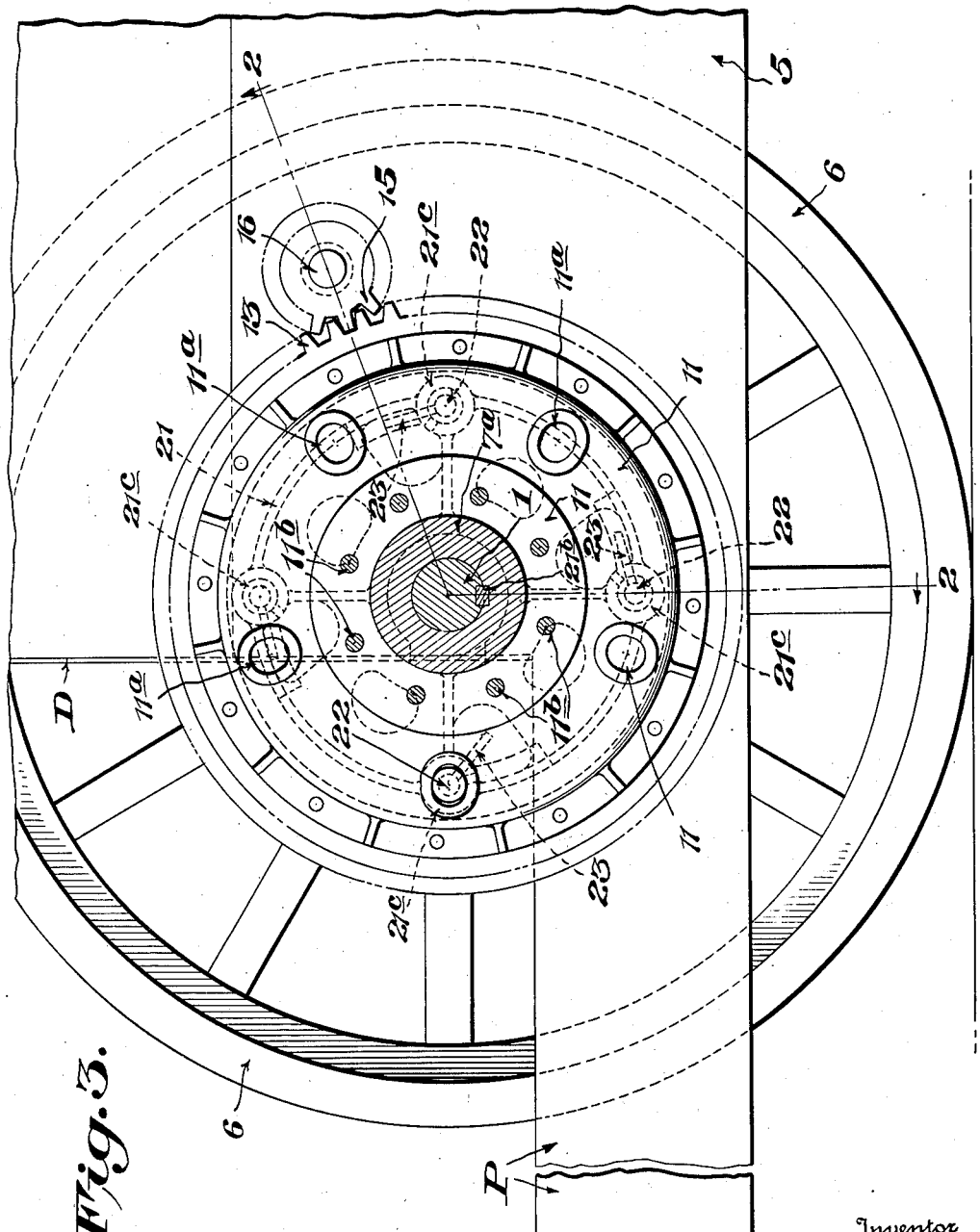

Patented May 6, 1941

2,240,887

UNITED STATES PATENT OFFICE 2,240,887

DRIVE WHEEL LOCK

Carl F. Greiner, Springfield, Ohio, assignor to The Buffalo-Springfield Roller Co., Springfield, Ohio, a corporation of Ohio Application November 12, 1940, Serial No. 365,386

17 Claims. (Cl. 180—70)

This invention relates to road rollers or the like, and more particularly to road rollers of the three-wheel type having a front steering roll and having a solid rotatable rear axle adjacent the rear operator's platform with two rear wheels or rolls rotatably mounted thereon, power being usually transmitted from a drive shaft disposed parallel with the rear axle having pinions respectively meshing with ring gears mounted on driven disks fixedly mounted on the rear axle adjacent the ground wheels to positively rotate said axle.

Heretofore, the rear wheels or rolls have been locked to, or unlocked from, their respective driven disks by manual means operable at the respective sides of the road roller adjacent the hubs of the rear wheels, and it has heretofore been necessary to employ additional attendants to walk at one or both sides of the road roller for the purpose of engaging or disengaging the respective locking means, so that the rear wheels may be permitted to rotate either at the same speed for straight line rolling, or at different speeds without injury to the solid rear axle such as when the road roller is rounding curves. Such road rollers are usually provided with a main operator's platform disposed slightly below and to the rear of the rear axle and extending between the ring gears, and said platform having a front dash plate likewise disposed slightly in rear of the rear axle.

The principal object of my invention is to provide a novel drive for road rollers of the above type including novel means operable directly by the one operator while standing or riding upon the rear platform, for manually locking or unlocking one of the rear wheels or rolls to its related driven disk, thereby obviating the necessity of having to provide extra attendants to walk beside the road roller; said means including a series of spring pressed locking bolts mounted in a disk fixed to the rear axle beside one rear wheel adapted to be engaged or disengaged by means accessible from the operator's platform with one of a series of holes in the hub of the said wheel, the use of a series of such bolts insuring that at least one such bolt will be always accessible in the exposed sector of the disk embraced between the platform and the dash plate, said bolts having means for holding same in retracted position disengaged from the hub, but when released will permit the bolt spring to project its related bolt into a hole in the related hub when the hole and bolt are rotated into alignment due to relative rotation of the drive disk and wheel. The other rear wheel is preferably in permanently locked engagement with its driven disk. In normal straight line rolling or movement of the road roller both rear wheels would be interconnected through the rear solid axle, but when the road roller is to round a curve the differential action between the rear wheels is effected by the operator while standing on the rear platform merely reaching down and pulling out into disengaged position the engaged locking bolt when same becomes accessible in the exposed sector of the driven disk between the dash plate and floor of the platform, whereupon the road roller will be propelled by both ground wheels through the differential gear.

When, however, it is desired to lock both wheels to the rear axle for straight line rolling, or for regaining traction when one rear wheel is spinning, it is merely necessary for the operator while standing on the rear platform to merely reach down and release the holding means of the bolt on the driven disk, while is accessible in the exposed sector of the driven disk between the dash plate and platform, and the related spring will force the released bolt into an aligned hole in the related hub as soon as sufficient slippage occurs between the disk and wheel to bring one of the holes in the hub into such alignment, the spring then forcing said bolt into locking engagement with the related hub.

Other minor objects of the invention will be hereinafter set forth.

I will explain the invention with reference to the accompanying drawings which illustrate one practical embodiment thereof to enable others to adopt and use the same; and will summarize in the claims, the novel features of construction, and novel combinations of parts, for which protection is desired.

In said drawings:

Fig. 1 is a side elevation of a road roller of the three-wheel type embodying my invention.

Fig. 3 is a section on the line 3—3, Fig. 2.

Fig. 4 is an enlarged end view of a bolt holding cylinder, showing the operating means in position to permit the bolt to engage the hub of the rear wheel.

Fig. 5 is a side elevation of the parts shown in Fig. 4.

Fig. 6 is a view similar to Fig. 4 showing the bolt held in disengaged or retracted position.

Fig. 7 is an elevation of the parts shown in Fig. 6.

Figure 2:
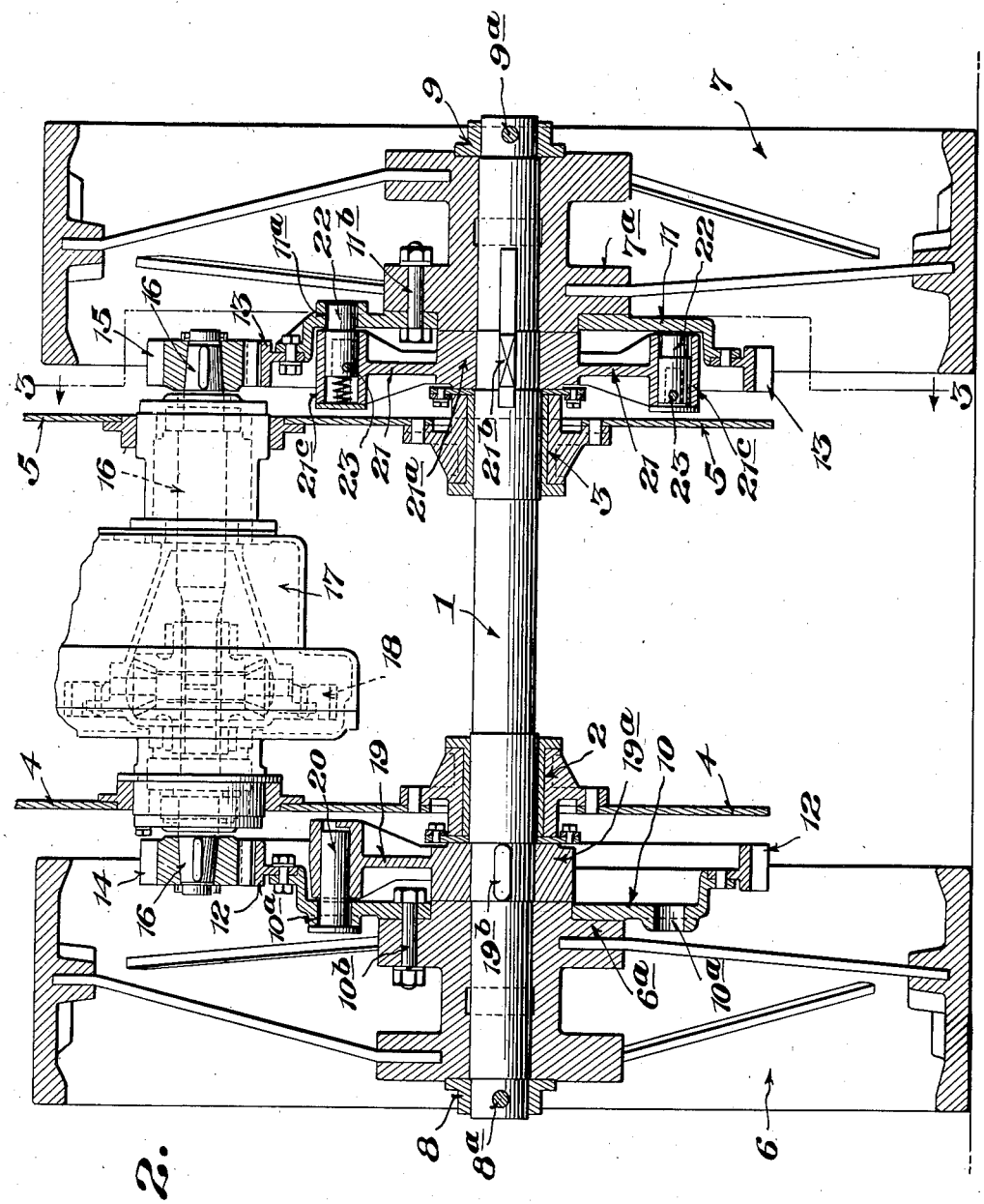
Fig. 2 is an enlarged section showing the driving means for the road wheels, on the line 2—2, Fig. 3.

As shown, the road roller is provided with a solid rear axle 1 rotatably mounted in bearings 2 and 3 (Fig. 2) carried by the side frames 4 and 5 of the road roller, the axle projecting through said side frames and carrying the rear ground rollers 6 and 7 which are loosely journaled at the ends thereof, same being held against axial movement by means of collars 8 and 9 at the ends of the axle transfixed by pins 8a and 9a or the like. The hubs 6a and 7a of the respective wheels are provided at their inner ends with annular web plates 10 and 11 which are preferably bolted or otherwise secured thereto as at 10b and 11b, said web plates carrying at their peripheries ring gears 12 and 13 meshing respectively with pinions 14 and 15 on a driving axle 16 having disposed therein a differential 17 in the usual manner, said differential cooperating with a transmission gear 18 driven by the engine (not shown) whereby both wheels 6 and 7 are normally directly driven from shaft 16 through differential 17 to propel the road roller.

In event however of spinning of one of the wheels 6 or 7 in ice or mud, it would not be possible to propel the road roller due to loss of traction, and therefore means are provided for rotating the rear axle 1 with one rear wheel such as 6, said means comprising an axle driving arm 19 (Fig. 2) having a hub 19a keyed as at 19b to axle 1, said arm 19 being disposed beside the inner end of the hub of wheel 6 adjacent the web plate 10, and having a pin 20 permanently engaged with a hole 10a in disk 10 whereby the solid axle 1 is caused to rotate in its bearings 2 and 3 by and with the rear wheel 6 and at the same angular speed.

In order to lock the opposite rear wheel 7 to the axle 1, particularly for straight line rolling, also in event one wheel should start spinning in ice or mud thereby resulting in loss of traction, a driven disk 21 is provided beside the web plate 11 which carries the ring gear 13 of wheel 7, said driven disk 21 having a hub 21a keyed as at 21b to axle 1; and in the periphery of disk 21 is provided an annular series of sockets 21c, four being indicated in Fig. 3 disposed on a pitch circle and spaced 90° apart, each of said sockets 21c housing a spring pressed bolt 22. In the web plate 11 of wheel 7 is provided an annular series of holes 11a, five being indicated in Figs. 1 and 3, said holes being disposed on the same pitch circle as the bolts 22 and evenly spaced apart, so that when any of the bolts 22 is released and projected towards the web plate 11 the same will after sufficient slippage between wheel 7 and disk 21 become aligned with one of the holes 11a in web plate 11, and the related spring of said bolt will project the bolt into the hole 11a and thereby lock the wheel 7 to axle 1 and to wheel 6. Thus the road roller will be able to regain the necessary traction to overcome spinning of one wheel which may occur when one wheel is operating in soft mud or on ice while the other wheel is operating on solid ground. Moreover, locking both wheels 6 and 7 to axle 1 reduces stresses on differential 17 and is therefore highly desirable for straight line rolling.

As shown in Figs. 1 and 3, each bolt 22 is provided with a pin 23 extending through a slot 21d in the side of the socket 21c and accessible to the operator on the rear platform, said pin being so disposed that when the pin 23 is at the innermost end of the slot the related bolt 22 will be entered in a hole 11a in the web plate 11 as shown in Figs. 4 and 5. The outer end of the slot is provided with an offset portion 21e into which the pin 23 may be engaged when the bolt is retracted in its socket 21c, the offset portion having a substantially semi-circular inner end so as to retain the pin 23 therein in such position that the bolt 22 will be fully retracted from the hole 11a in web plate 11 as shown in Figs. 6 and 7. The outer end of each socket 21c is closed by a plate 21f and a coiled spring 24 is interposed between the plate 21f and the base of an axial bore 22a in the adjacent end of bolt 22, said spring 24 normally urging the bolt 22 towards the web plate 11, so that when the pin 23 is disengaged from the offset portion 21e of the slot 21d the spring 24 will yieldably urge the bolt into hole 11a when aligned therewith.

As shown in Figs. 1 and 3, the above arrangement of bolts 22 and holes 11a is such that regardless of where the axle stops rotating there will always be at least one bolt 22 accessible to the operator standing on the rear platform P in the exposed sector of the driven disk 21 embraced between the floor of platform P and the dash plate D (Fig. 3) so that the operator may at any time be able to release the arm 23 of the exposed bolt so that the wheel 7 will be locked to the driven disk 21. A greater or lesser number of bolts 22 may be provided according to the area of the exposed sector of the driven disk 21 to provide at least one exposed bolt 22 therein.

I claim:

1. In a road roller or the like, a frame; a solid rotatable axle journaled therein; ground wheels carried by said axle at opposite sides of the frame; an operator's platform in the frame between said wheels; means including a differential shaft for normally driving both of said wheels, and for normally rotating the axle with one said wheel; a driven disk keyed to said axle adjacent the hub of the other said wheel and having a portion exposed at the operator's platform; and manually operable means on said disk accessible from the platform for locking and unlocking the disk to the adjacent wheel.

2. In a road roller as set forth in claim 1, said manually operable means comprising a bolt mounted in an open socket in said disk and adapted to enter a hole in the wheel; a spring in the socket engaging the bolt; the socket having an axial slot therethrough provided with an offset portion; and a radially disposed rod on the bolt slidably engaging the slot, and adapted when engaged with the offset portion to retain the bolt disengaged from the hole in the wheel.

3. In a road roller or the like, a frame; a solid rotatable axle journaled therein; ground wheels carried by said axle at opposite sides of the frame; an operator's platform in the frame between said wheels; a drive shaft including a differential disposed parallel with the axle; relatively large ring gears on said wheels; pinions on the drive shaft at opposite sides of the differential meshing with said ring gears respectively; means for rotating the axle with one of said wheels; a driven disk keyed to said axle adjacent the hub of the other said wheel and having a portion exposed at the operator's platform; and manually operable means on said disk accessible from the platform for locking and unlocking the disk to the adjacent wheel.

4. In a road roller as set forth in claim 3, said axle rotating means comprising an arm keyed on the axle adjacent one wheel; and a pin in said arm permanently engaging a hole in the said wheel.

5. In a road roller as set forth in claim 3, said manually operable means comprising a bolt mounted in an open socket in said disk and adapted to enter a hole in the wheel; a spring in the socket engaging the bolt; the socket having an axial slot therethrough provided with an offset portion; and a radially disposed rod on the bolt slidably engaging the slot, and adapted when engaged with the offset portion to retain the bolt disengaged from the hole in the wheel.

6. In a road roller or the like, a frame; a solid rotatable axle journaled therein; ground wheels carried by said axle at opposite sides of the frame; an operator's platform in the frame between said wheels; means including a differential shaft for normally driving both wheels and for normally rotating the axle with one said wheel; a driven disk keyed to said axle adjacent the hub of the other said wheel and having a portion exposed at the operator's platform; an annular series of bolts in said disk adapted to be individually projected into one of an annular series of holes in the hub of the adjacent wheel and thereby lock the wheel to said axle; and means on the bolts accessible from the platform in the exposed portion of the disk for actuating the exposed bolt.

7. In a road roller as set forth in claim 6, said bolts being each mounted in open ended sockets in said disk; a plate closing the outer end of each socket; a spring interposed between each plate and its bolt; each socket having an axial slot therethrough provided with an offset portion adjacent the plate; and said actuating means comprising a radially disposed pin on each bolt slidably engaging its slot, and adapted when in the offset portion to retain the bolt in retracted position.

8. In a road roller or the like, a frame; a solid rotatable rear axle journaled therein; ground wheels carried by said axle at opposite sides of the frame; an operator's platform in the frame between said wheels; a drive shaft including a differential disposed parallel with the axle; relatively large ring gears on said wheels; pinions on the drive shaft at opposite sides of the differential meshing with said ring gears respectively; means for rotating the axle with one said wheel; a driven disk keyed to said axle adjacent the hub of the other said wheel and having a portion exposed at the operator's platform; an annular series of bolts in said disk adapted to be individually projected into one of an annular series of holes in the hub of the adjacent wheel and thereby lock the wheel to said axle; and means on the bolts accessible from the platform in the exposed portion of the disk for actuating the exposed bolt.

9. In a road roller as set forth in claim 8, said axle rotating means comprising an arm keyed on the axle adjacent one wheel; and a pin in said arm permanently engaging a hole in the said wheel.

10. In a road roller as set forth in claim 8, said ring gears being carried by web plates secured to the hubs of the wheels; and said axle rotating means comprising an arm keyed on the axle adjacent one wheel; and a pin in said arm permanently engaging a hole in the web plate of the said wheel.

11. In a road roller as set forth in claim 8, said bolts being each mounted in open ended sockets in said disk; a plate closing the outer end of each socket; a spring interposed between each plate and its bolt; each socket having an axial slot therethrough provided with an offset portion adjacent the plate; and said actuating means comprising a radially disposed pin on each bolt slidably engaging its slot, and adapted when in the offset portion to retain the bolt in retracted position.

12. In a road roller as set forth in claim 8, said ring gears being carried by web plates secured to the hubs of the wheels; and said driven disk being disposed adjacent one web plate; said bolts being each mounted in open ended sockets in said disk; a plate closing the outer end of each socket; a spring interposed between each plate and its bolt; each socket having an axial slot therethrough provided with an offset portion adjacent the plate; and said actuating means comprising a radially disposed pin on each bolt slidably engaging its slot, and adapted when in the offset portion to retain the bolt in retracted position.

13. In a road roller or the like, a frame; a solid rotatable rear axle journaled in the frame; rear ground wheels carried by said axle at opposite sides of the frame; a rear operator's platform disposed substantially at the level of the rear axle and having a dash plate disposed substantially opposite the rear axle; a drive shaft including a differential disposed parallel with the axle; relatively large ring gears on said rear wheels; pinions on the drive shaft at opposite sides of the differential meshing with said ring gears respectively; means for rotating the axle with one said wheel; a driven disk keyed to said axle adjacent the hub of the other said wheel and having a sector subtended by the angle formed between the platform and dash plate accessible from the operator's platform; an annular series of bolts in said disk adapted to be individually projected into one of an annular series of holes in the hub of the adjacent wheel and thereby lock the wheel to said axle; and means on the bolts accessible from the platform in the exposed sector for actuating the exposed bolt.

14. In a road roller as set forth in claim 13, said axle rotating means comprising an arm keyed on the axle adjacent one wheel; and a pin in said arm permanently engaging a hole in the said wheel.

15. In a road roller as set forth in claim 13, said ring gears being carried by web plates secured to the hubs of the wheels; and said axle rotating means comprising an arm keyed on the axle adjacent one wheel; and a pin in said arm permanently engaging a hole in the web plate of the said wheel.

16. In a road roller as set forth in claim 13, said bolts being each mounted in open ended sockets in said disk; a plate closing the outer end of each socket; a spring interposed between each plate and its bolt; each socket having an axial slot therethrough provided with an offset portion adjacent the plate; and said actuating means comprising a radially disposed pin on each bolt slidably engaging its slot, and adapted when in the offset portion to retain the bolt in retracted position.

17. In a road roller as set forth in claim 13, said ring gears being carried by web plates secured to the hubs of the wheels; and said driven disk being disposed adjacent one web plate; said bolts being each mounted in open ended sockets in said disk; a plate closing the outer end of each socket; a spring interposed between each plate and its bolt; each socket having an axial slot therethrough provided with an offset portion adjacent the plate; and said actuating means comprising a radially disposed pin on each bolt slidably engaging its slot, and adapted when in the offset portion to retain the bolt in retracted position.

CARL F. GREINER.